US011101649B2

(12) United States Patent
Saunders

(10) Patent No.: US 11,101,649 B2
(45) Date of Patent: Aug. 24, 2021

(54) INTERFACE CIRCUITRY WITH MULTIPLE DIRECT CURRENT POWER CONTACTS

(71) Applicant: Intel Corporation, Santa Clara, CA (US)

(72) Inventor: Bradley Saunders, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 16/218,371

(22) Filed: Dec. 12, 2018

(65) Prior Publication Data
US 2019/0115752 A1   Apr. 18, 2019

(51) Int. Cl.
*H02J 1/12*  (2006.01)
*G06F 1/26*  (2006.01)
*H02J 1/06*  (2006.01)
H02J 13/00  (2006.01)
H02J 1/08  (2006.01)

(52) U.S. Cl.
CPC .................. *H02J 1/12* (2013.01); *G06F 1/26* (2013.01); *G06F 1/266* (2013.01); *H02J 1/06* (2013.01); *H02J 1/082* (2020.01); *H02J 13/0003* (2013.01)

(58) Field of Classification Search
CPC ...... H02J 1/12; H02J 1/06; H02J 1/082; H02J 13/0003; H02J 13/00017; G06F 1/26; G06F 1/266
See application file for complete search history.

(56) References Cited

U.S. PATENT DOCUMENTS

| 7,745,954 | B1* | 6/2010 | Menas ..................... H01R 9/03 307/38 |
| 9,864,421 | B2* | 1/2018 | Li ..................... H04L 12/40045 |
| 10,481,661 | B2* | 11/2019 | Cooper .................... G06F 1/266 |
| 10,642,333 | B2* | 5/2020 | Krishnakumar ...... G06F 1/3212 |
| 2003/0107566 | A1* | 6/2003 | Shin ........................ G06F 1/266 345/212 |
| 2003/0128507 | A1* | 7/2003 | Metcalf ................... G06F 1/266 361/679.21 |
| 2005/0102043 | A1* | 5/2005 | Menas ..................... H02J 1/00 700/22 |
| 2005/0185352 | A1* | 8/2005 | Nguyen ................... H02J 1/10 361/90 |
| 2017/0126973 | A1* | 5/2017 | Skeoch ............. H04N 5/23241 |
| 2019/0064914 | A1* | 2/2019 | Krishnakumar ...... H02J 7/0068 |
| 2019/0210473 | A1* | 7/2019 | Linehan ................ H02J 7/0068 |

* cited by examiner

*Primary Examiner* — Jared Fureman
*Assistant Examiner* — Michael J Warmflash
(74) *Attorney, Agent, or Firm* — Schwabe, Williamson & Wyatt, P.C.

(57) ABSTRACT

Embodiments may include apparatuses, systems, and methods for direct current power distribution. An apparatus includes a first power contact, a second power contact, and a controller coupled to the first power contact and the second power contact. The first power contact is coupled to a first power distribution line supplying DC power to the first power contact at a first voltage level. The second power contact is coupled to a second power distribution line supplying DC power to the second power contact at a second voltage level different from the first voltage level. The controller is to control a first power connection established with the first power contact based on a first power contract, or a second power connection established with the second power contact based on a second power contract. Other embodiments may be described and/or claimed.

22 Claims, 6 Drawing Sheets

INTERFACE CIRCUITRY WITH MULTIPLE DIRECT CURRENT POWER CONTACTS

FIELD

Embodiments herein relate generally to the technical field of communication, computing, power distribution, and more particularly to interface circuitry with multiple direct current power contacts.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Alternating current (AC) power distribution may be an important power distribution model. However, AC power distribution may be limited by the availability of AC power distribution infrastructures. Direct current (DC) power distribution may be used to replace AC power distribution when AC power distribution infrastructures are not available. In addition, compared to AC power distribution, DC power distribution may be better aligned with other forms of power generation, e.g., solar power.

A computer bus or a communication link may be a part of a communication system that facilitates transfer of data between devices or components inside or between computing or communication devices, coupled to the computer bus. A device or component may be coupled to a computing bus through an interface circuitry. A computer bus, in addition to the hardware components (wire, optical fiber, etc.), may have associated software, communication protocols, and so forth. A communication protocol may be a set of rules that allow two devices to communicate information on a computer bus or a communication link between them. There may be many kinds of computer bus, such as serial buses or parallel buses. Sometimes, in addition to data transmission, a computer bus may be used to distribute power between computing or communication devices as well. However, there are many limitations for power distribution by computer buses.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
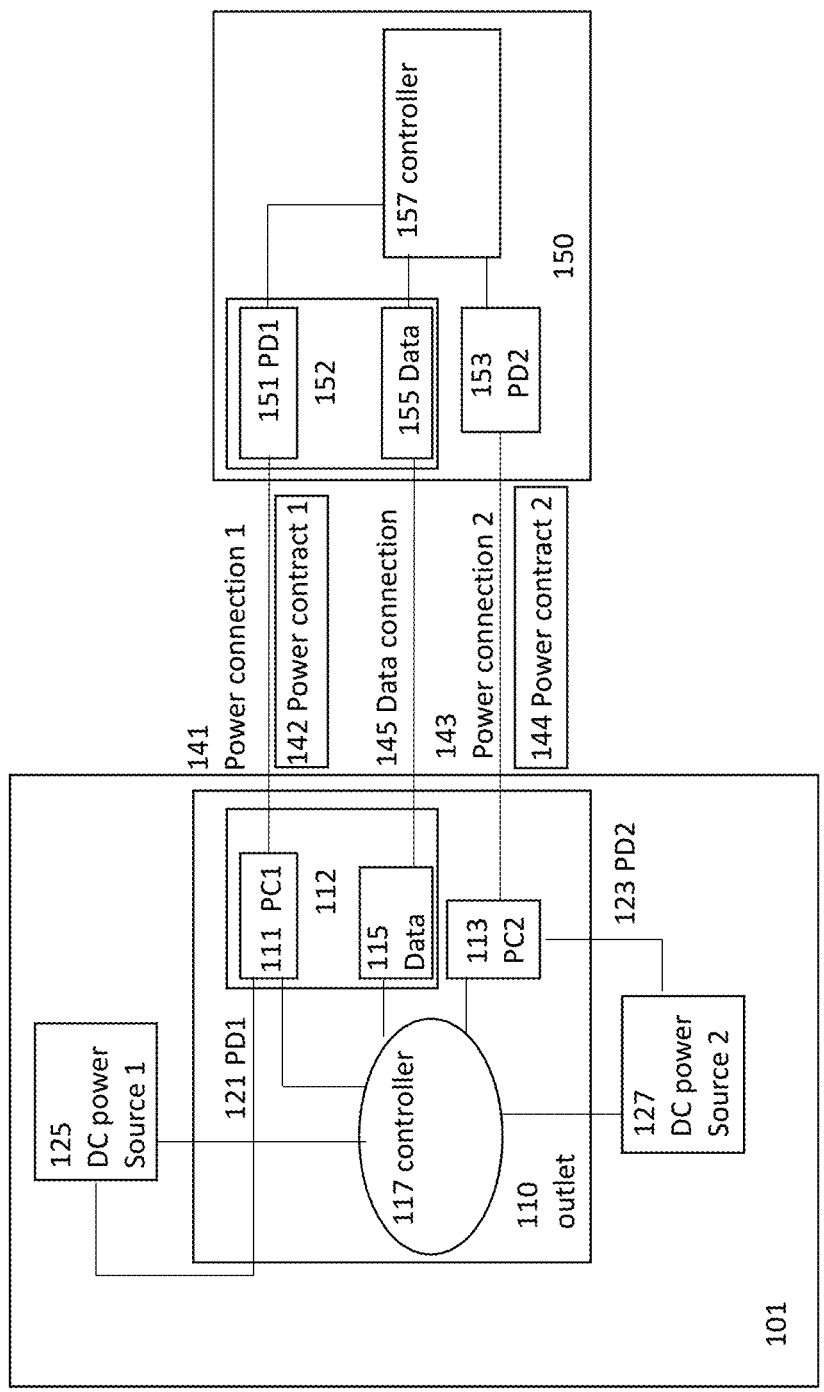
FIG. 1 illustrates an example power distribution apparatus including multiple power contacts for direct current power distribution, in accordance with various embodiments.

As described earlier, a computer bus or a communication link may be a part of a communication system that facilitates transfer of data between devices or components. An external device to a computer device may be coupled to a computer bus of the computer device through an interface circuitry of the computer device. Operations of the computer bus may be based on various standards or communication protocols, e.g., a universal serial bus (USB) protocol for the USB bus, a peripheral component interconnect (PCI) protocol for the PCI bus, and so forth.

Direct current (DC) power delivery by a computer bus may be gaining popularities. For example, a USB Type-C bus may deliver DC power over a USB cable up to nearly 100 W (20V @ 5 A) while remaining within product safety limits. In fact, DC power distribution by USB buses is becoming a primary method for charging and powering popular electronic devices, e.g., small appliances and consumer electronics. However, current USB Standard-A and USB Type-C sockets may be limited to DC power distribution below 100 W, e.g., 20 V and 5 A. Power delivery over 100 W may incur increased cost and complexity for a computer bus.

In embodiments, an apparatus for power distribution includes a first power contact, a second power contact, and a controller coupled to the first power contact and the second power contact. The first power contact is coupled to a first power distribution line supplying DC power to the first power contact at a first voltage level. The second power contact is coupled to a second power distribution line supplying DC power to the second power contact at a second voltage level different from the first voltage level. The controller is to control a first power connection established with the first power contact based on a first power contract, or a second power connection established with the second power contact based on a second power contract. In some other embodiments, there may be more than two power contacts.

In embodiments, an apparatus for communication includes a USB port having a first power contact and a data contact, and a second power contact. The first power contact and the data contact are a part of a serial input/output (I/O) interface that is USB 3.x, USB 2.0, or USB 1.1 compliant. The first power contact is coupled to a first power distribution line supplying DC power to the first power contact at a first voltage level. The second power contact is coupled to a second power distribution line supplying DC power to the second power contact at a second voltage level different from the first voltage level.

In embodiments, an apparatus for computing includes a printed circuit board (PCB). Various components, e.g., a communication port including a first power contact and a data contact, a second power contact, and a controller, are disposed on the PCB. The first power contact is coupled to a first power distribution line supplying DC power to the first power contact at a first voltage level, and the data contact is for establishment of a data line to communicate according to a communication protocol. The second power contact is coupled to a second power distribution line supplying DC power to the second power contact at a second voltage level different from the first voltage level. The controller is communicatively coupled to the data contact, the first power contact, and the second power contact to control the communication protocol for the data line; a first power connection established with the first power contact based on a first power contract; and a second power connection established with the second power contact based on a second power contract.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrases "A/B," "A or B," and "A and/or B" mean (A), (B), or (A and B). For the purposes of the present disclosure, the phrases "A, B, or C" and "A, B, and/or C" mean (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As discussed herein, the term "module" may be used to refer to one or more physical or logical components or elements of a system. In some embodiments, a module may be a distinct circuit, while in other embodiments a module may include a plurality of circuits.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled with" and "coupled to" and the like may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. By way of example and not limitation, "coupled" may mean two or more elements or devices are coupled by electrical connections on a printed circuit board such as a motherboard, for example. By way of example and not limitation, "coupled" may mean two or more elements/devices cooperate and/or interact through one or more network linkages such as wired and/or wireless networks. By way of example and not limitation, a computing apparatus may include two or more computing devices "coupled" on a motherboard or by one or more network linkages.

As used herein, the term "circuitry" refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD), (for example, a field-programmable gate array (FPGA), a programmable logic device (PLD), a complex PLD (CPLD), a high-capacity PLD (HCPLD), a structured ASIC, or a programmable System on Chip (SoC)), digital signal processors (DSPs), etc., that are configured to provide the described functionality. In some embodiments, the circuitry may execute one or more software or firmware programs to provide at least some of the described functionality.

As used herein, the term "processor circuitry" may refer to, is part of, or includes circuitry capable of sequentially and automatically carrying out a sequence of arithmetic or logical operations; recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes.

As used herein, the term "interface circuitry" may refer to, is part of, or includes circuitry providing for the exchange of information between two or more components or devices. The term "interface circuitry" may refer to one or more hardware interfaces (for example, buses, input/output (I/O) interfaces, peripheral component interfaces, network interface cards, and/or the like).

As used herein, the term "computer device" may describe any physical hardware device capable of sequentially and automatically carrying out a sequence of arithmetic or logical operations, equipped to record/store data on a machine readable medium, and transmit and receive data from one or more other devices in a communications network. A computer device may be considered synonymous to, and may hereafter be occasionally referred to, as a computer, computing platform, computing device, etc. The term "computer system" may include any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources. Examples of "computer devices", "computer systems", etc. may include cellular phones or smart phones, feature phones, tablet personal computers, wearable computing devices, an autonomous sensors, laptop computers, desktop personal computers, video game consoles, digital media players, handheld messaging devices, personal data assistants, an electronic book readers, augmented reality devices, server computer devices (e.g., stand-alone, rack-mounted, blade, etc.), cloud computing services/systems, network elements, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management Systems (EEMSs), electronic/engine control units (ECUs), vehicle-embedded computer devices (VECDs), autonomous or semi-autonomous driving vehicle (hereinafter, simply ADV) systems, in-vehicle navigation systems, electronic/engine control modules (ECMs), embedded systems, microcontrollers, control modules, engine management systems (EMS), networked or "smart" appliances, machine-type communications (MTC) devices, machine-to-machine (M2M), Internet of Things (IoT) devices, and/or any other like electronic devices. Moreover, the term "vehicle-embedded computer device" may refer to any computer device and/or computer system physically mounted on, built in, or otherwise embedded in a vehicle.

As used herein, the term "network element" may be considered synonymous to and/or referred to as a networked computer, networking hardware, network equipment, router, switch, hub, bridge, radio network controller, radio access network device, gateway, server, and/or any other like device. The term "network element" may describe a physical computing device of a wired or wireless communication network and be configured to host a virtual machine. Furthermore, the term "network element" may describe equipment that provides radio baseband functions for data and/or voice connectivity between a network and one or more users. The term "network element" may be considered synonymous to and/or referred to as a "base station." As used herein, the term "base station" may be considered synonymous to and/or referred to as a node B, an enhanced or eNB, gNB, base transceiver station (BTS), access point (AP), roadside unit (RSU), etc., and may describe equipment that provides the radio baseband functions for data and/or voice connectivity between a network and one or more users. As used herein, the terms "vehicle-to-vehicle" and "V2V" may refer to any communication involving a vehicle as a source or destination of a message. Additionally, the terms "vehicle-to-vehicle" and "V2V" as used herein may also encompass or be equivalent to vehicle-to-infrastructure (V2I) communications, vehicle-to-network (V2N) communications, vehicle-to-pedestrian (V2P) communications, or V2X communications.

As used herein, the term "channel" may refer to any transmission medium, either tangible or intangible, which is used to communicate data or a data stream. The term "channel" may be synonymous with and/or equivalent to "physical channel," "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" may refer to a connection between two devices through a Radio Access Technology (RAT) for the purpose of transmitting and receiving information.

FIG. 1 illustrates an example power distribution apparatus 110 including multiple power contacts, e.g., a power contact 111, and a power contact 113, for direct current power distribution, in accordance with various embodiments. For clarity, features of the power distribution apparatus 110, the power contact 111, and the power contact 113 are described below as an example of a power distribution apparatus including multiple power contacts for direct current power distribution. It is to be understood that there may be more or fewer components included in the power distribution apparatus 110, the power contact 111, and the power contact 113. Further, it is to be understood that one or more of the devices and components within the power distribution apparatus 110, the power contact 111, and the power contact 113 may include additional and/or varying features from the description below, and may include any device that one having ordinary skill in the art would consider and/or refer to as a power distribution apparatus including multiple power contacts for direct current power distribution.

In embodiments, the power distribution apparatus 110 may be a socket, a receptacle, a power outlet, a plug, or a jack; and may be placed within an entity 101, and coupled to a DC power source 125 or a DC power source 127. In some embodiments, the entity 101 may be a residential or commercial premise. In some other embodiments, the entity 101 may be a printed circuit board (PCB) or a computing device, while the power distribution apparatus 110 may be disposed in the PCB or the computing device.

In embodiments, the power distribution apparatus 110 includes the power contact 111, the power contact 113, a data contact 115, and a controller 117. In some other embodiments, the data contact 115 may not be present, and the power distribution apparatus 110 may be without any data contact. The controller 117 is coupled to the power contact 111, the power contact 113, and the data contact 115. In addition, the controller 117 may be coupled to the DC power source 125 or the DC power source 127 to control operations of the DC power source 125 or the DC power source 127 based on a power contract.

In embodiments, the power distribution apparatus 110 may be coupled to a power distribution apparatus 150. The power distribution apparatus 150 includes a power contact 151, a power contact 153, a data contact 155, and a controller 157. A power connection 141 is established with the power contact 111 and the power contact 151. A power connection 143 is established with the power contact 113 and the power contact 153. A data connection 145 is established with the data contact 115 and the data contact 155. In some embodiments, the power distribution apparatus 150 may include two separated components. For example, the power contact 151 and the data contact 155 form a communication port 152, which may be a part of a serial input/output (I/O) interface that is universal serial bus (USB) 3.x, USB 2.0, or USB 1.1 compliant, while the power contact 153 may be a separated power plug or a standard DC power contact.

In embodiments, the power contact 111 is coupled to a power distribution line 121 supplying DC power to the power contact 111 at a first voltage level, where the power distribution line 121 is coupled to the DC power source 125. The power contact 113 is coupled to a power distribution line 123 supplying DC power to the power contact 113 at a second voltage level, where the power distribution line 123 is coupled to the DC power source 127. In some other embodiments, the power contact 111 or the power contact 113 may be coupled to a power sink. The power distribution line 121 may be a part of a communication bus, and the power distribution line 123 may be a part of a power grid of the entity 101. In some embodiments, the first voltage level supplied to the power contact 111 is different from the second voltage level supplied to the power contact 113. For example, the first voltage level is less than 21 volt, and the second voltage level is higher than 21 volt. Furthermore, multiple voltage levels may be supplied on the power distribution line 121 or the power distribution line 123. For example, the controller 117 may control the power contact 113 to be at the second voltage level or a third voltage level, which is different from the second voltage level.

In embodiments, the controller 117 is coupled to the power contact 111 to control the power connection 141 established with the power contact 111 based on a power contract 142, or the power connection 143 established with the power contact 113 based on a power contract 144. The power connection 141 and the power connection 143 may be two independent power paths without any intersection. The controller 117 may provide an extensible and robust solution for negotiating a power contract between a source and a sink. In detail, the controller 117 provides flexible protocols that can work in conjunction with policy logic to optimize power delivery shared across multiple outlets or from multiple sources. For example, the controller 117 may negotiate the power contract 142 for the power connection 141 established with the power contact 111, or negotiate the power contract 144 for the power connection 143 established with the power contact 113. In addition, the controller 117 may allow for the power contract 142 and the power contract 144 to be negotiated at a same time for two independent power paths when the power distribution apparatus 150 may be coupled to the power distribution apparatus 110. Hence, embodiments herein, e.g., the power distribution apparatus 110, are different from a mechanical device that may include two or more power contacts for two independent power paths without being controlled by one shared controller.

In embodiments, the power contract 142 for the power connection 141 with the power contact 111 may be a part of a first communication protocol, the power contract 144 for the power connection 143 with the power contact 113 may be a part of a second communication protocol, and the first and second communication protocols are different communication protocols at least in part. The power contract 142 may include parameters for the power connection 141 about a voltage level of the power connection 141, a current level of the power connection 141, a power output of the power connection 141, a profile of the voltage level of the power connection 141, a profile of the current level of the power connection 141, or a profile of the power output of the power connection 141. Similarly, the power contract 144 may include parameters for the power connection 143 about a voltage level of the power connection 143, a current level of the power connection 143, a power output of the power connection 143, a profile of the voltage level of the power connection 143, a profile of the current level of the power connection 143, or a profile of the power output of the power connection 143.

In embodiments, the power contact 111 and the data contact 115 may form a communication port 112, which may be a part of a serial I/O interface or connector of a communication protocol. For example, the communication port 112 may be USB 3.x, USB 2.0, or USB 1.1 compliant. The communication port 112 including the power contact 111 and the data contact 115 may be a part of a downstream facing port (DFP), a upstream facing port (UFP), or a dual-role-data (DRD) port. In some embodiments, the communication port 112 including the data contact 115 is a part of an interface for a bi-directional communication protocol, or a half-duplex communication protocol. For example, the data contact 115 is a part of an interface to facilitate communication according to a communication protocol, selected from either a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit ($I^2C$) protocol. In addition, the power contact 113 may be a standard DC power contact.

In embodiments, except for the teachings of the present disclosure incorporated, the entity 101 may be a computing device or a computing system, for example, a laptop computer, an ultra-laptop computer, a tablet, a touch pad, a portable computer, a handheld computer, a wearable device, a palmtop computer, a personal digital assistant (PDA), an e-reader, a cellular telephone, a combination cellular telephone/PDA, a mobile smart device (e.g., a smart phone, a smart tablet, etc.), a mobile internet device (MID), a mobile messaging device, a mobile data communication device, a mobile media playing device, a camera, a mobile gaming console, etc. In embodiments, the entity 101 may also be a non-mobile device that may include, but is not to be limited to, for example, a personal computer (PC), a television, a smart television, a data communication device, a media playing device, a gaming console, a gateway, an Internet of Things (TOT) device, etc. The entity 101 may also include storage devices to store logic and data associated with the programs and services used by the entity 101.

In embodiments, the controller 117 may be a central processing unit (CPU) located in a printed circuit board (PCB). In some embodiments, the controller 117 may be a programmable device that may execute a program. In embodiments, the controller 117 may be a microcontroller, a 16-bit processor, a 32-bit processor, a 64-bit processor, a single core processor, a multi-core processor, a digital signal processor, an embedded processor, or any other processor. In embodiments, an operating system may be operated on the controller 117, which may include the system driver for various protocols. The operating system may include any system software that manages hardware or software resources, and may provide services to applications. The operating system may be Windows®, Android OS, iOS, Linux, a real-time operating system (RTOS), an automotive infotainment operating system, among others. For example, the operating system may be a real-time operating system such as VxWorks, PikeOS, eCos, QNX, MontaVista Linux, RTLinux, Windows CE, or other operating system.

In embodiments, the entity 101, the power distribution apparatus 110, and the controller 117 may be implemented in various ways. The entity 101 and the processor 117 may be implemented by a computing platform 500 shown in FIG. 5, and may execute instructions stored in a computer-readable medium, e.g., the computer-readable medium 602 as shown in FIG. 6, or may be pre-configured with the logic (e.g., with appropriate bit streams, logic blocks, etc.).

Figure 2:
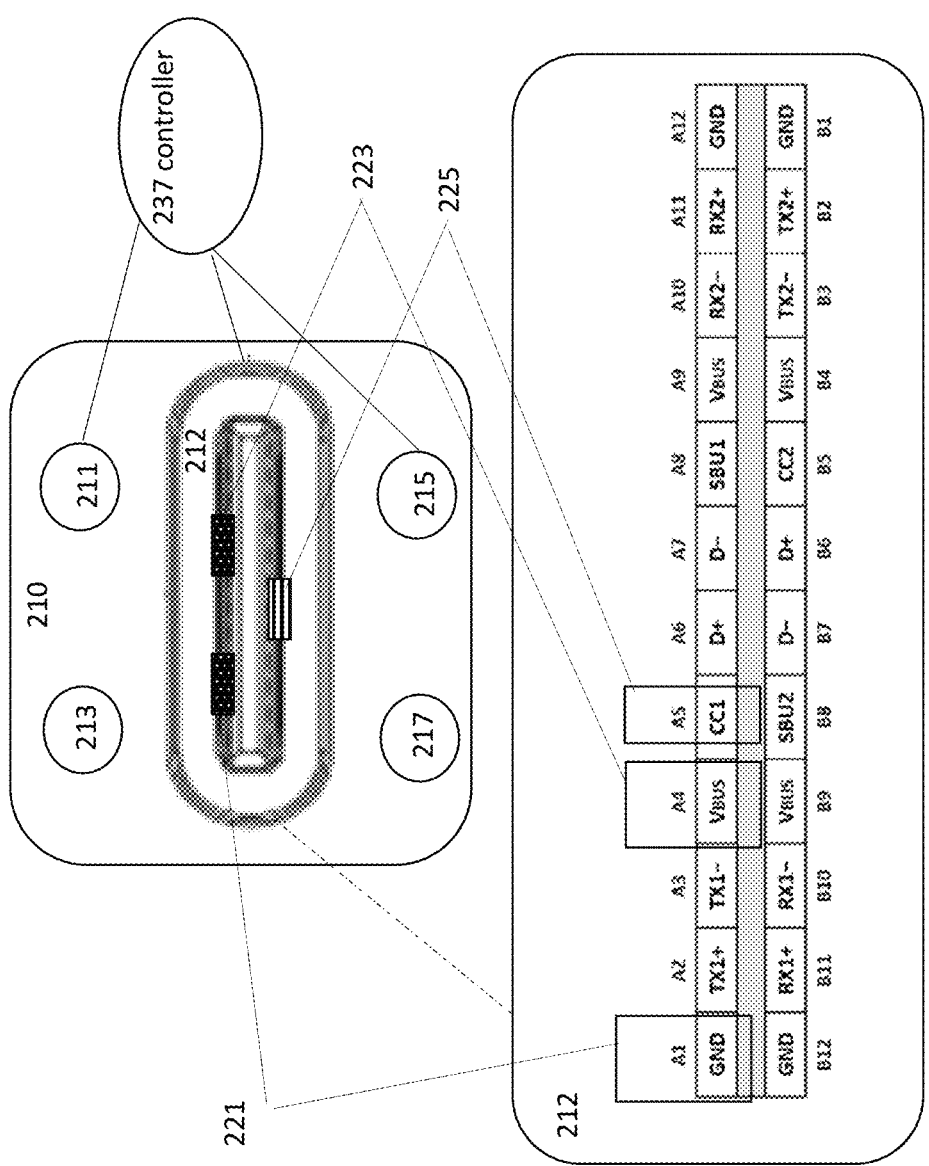
FIG. 2 illustrates another example power distribution apparatus including multiple power contacts for direct current power distribution, in accordance with various embodiments.

FIG. 2 illustrates another example power distribution apparatus 210 including multiple power contacts, e.g., a power contact 211, a power contact 213, a power contact 215, a power contact 217, a power contact 221, and a power contact 223, for direct current power distribution, in accordance with various embodiments. In embodiments, the power distribution apparatus 210, the power contact 211, the power contact 213, the power contact 215, the power contact 217, the power contact 221, and the power contact 223 may be examples of the power distribution apparatus 110, the power contact 111, and the power contact 113, respectively, as shown in FIG. 1.

In embodiments, the power distribution apparatus 210 may be a socket, a receptacle, a power outlet, a plug, or a jack. The power distribution apparatus 210 may include the power contact 211, the power contact 213, the power contact 215, the power contact 217, which may be standard DC power contacts. In addition, the power distribution apparatus 210 may include a communication port 212 containing the power contact 221, the power contact 223, and a data contact 225. The power contact 211, the power contact 213, the power contact 215, the power contact 217, and the communication port 212 containing the power contact 221, the power contact 223, and the data contact 225 may be coupled to a controller 237 to control direct current power distribution through the multiple power contacts.

In embodiments, the power contact 221, the power contact 223, and the data contact 225 may be a part of the communication port 212 that is USB 3.x, USB 2.0, or USB 1.1 compliant. For example, the communication port 212 may be a USB type-C connector, and the power contact 221 and the power contact 223 are the pin A1 (GND) and pin A4 (VBUS) respectively used for DC power distribution, while the data contact 225 is the pin A5 (CC1) used for a data connection. In addition, the communication port 212 may include data contacts, e.g., e.g., pins A2-A3, A6-A12, B1-B12, forming the USB type-C connector.

In some embodiments, there may be more or fewer power contacts than the one shown in FIG. 2. The power contact 211, the power contact 213, the power contact 215, and the power contact 217 may be of various sizes, shapes, or positions within the power distribution apparatus 210. In a symmetrical design, the communication port 212 may be placed in or around the center of the power distribution apparatus 210. Additionally and alternatively, in a non-symmetrical design, the communication port 212 may be displaced from the center of the power distribution apparatus 210. In some embodiments, the power contact 211, the power contact 213, the power contact 215, the power contact 217 may be ground contacts as well.

In embodiments, a first power contact, e.g., the power contact 211, the power contact 213, the power contact 215, or the power contact 217, may be coupled to a first power distribution line supplying DC power to the first power contact at a first voltage level. On the other hand, a second power contact, e.g., the power contact 221 or the power contact 223 within the communication port 212 may be coupled to a second power distribution line supplying DC power to the second power contact at a second voltage level different from the first voltage level is. In embodiments, the power contact 211, the power contact 213, the power contact 215, the power contact 217 may operate at various voltage levels, e.g., 24 V, 36 V, 48 V, etc., and/or currents, e.g., larger than 5 A, while the power contact 221 and the power contact 223 of the communication port 212, which may be a USB port, may operate at a voltage less than 20 V or current less than 5 A.

In some embodiments, the power distribution apparatus 210 may be a combination of a USB Type-C receptacle, e.g., the communication port 212, with extra DC power contacts, e.g., the power contact 211, the power contact 213, the power contact 215, and the power contact 217, in a common and standardized socket such that devices of differing power demands can share a common power outlet, e.g., the power distribution apparatus 210. The power distribution apparatus 210 may receive either standard USB Type-C plugs, or a larger combinational plug with a USB Type-C port and additional DC power contacts. Additionally, the USB power delivery negotiation and management protocol operating over the CC wire of the USB Type-C interface may be extended to cover not only the USB Type-C portion of the power distribution apparatus 210 but also the higher power DC offered on the extra power contacts of the power distribution apparatus 210. Combining USB technology in a seamless way with higher power DC delivery methods potentially enables, in addition to just addressing power, a path to also distributing data and display applications as a parallel enhancement to the power distribution model. As a result, the USB data bus lines may be similarly built within the infrastructure using the USB tree model or alternatively an appropriate bridge between USB and some form of networking technology incorporated into the outlet.

There may be some existing AC power outlets that incorporate USB receptacles with AC power contacts, which may appear similar in appearance to the power distribution apparatus 210. However, the AC power contacts and the USB Type-C receptacle are not intended to allow simultaneous use by some form of combinational plug. Instead, when the AC power contacts of an existing AC power outlets incorporating USB receptacles are in use, the USB receptacles may not be in operation, or vice versa. In addition, a USB Standard-A or a USB Type-C socket in combination with AC power contacts may be a mechanical combination only, where the USB Standard-A or a USB Type-C socket and the AC power outlets are not controlled by a common controller and perform DC power distribution according to various power contracts.

Figure 3:
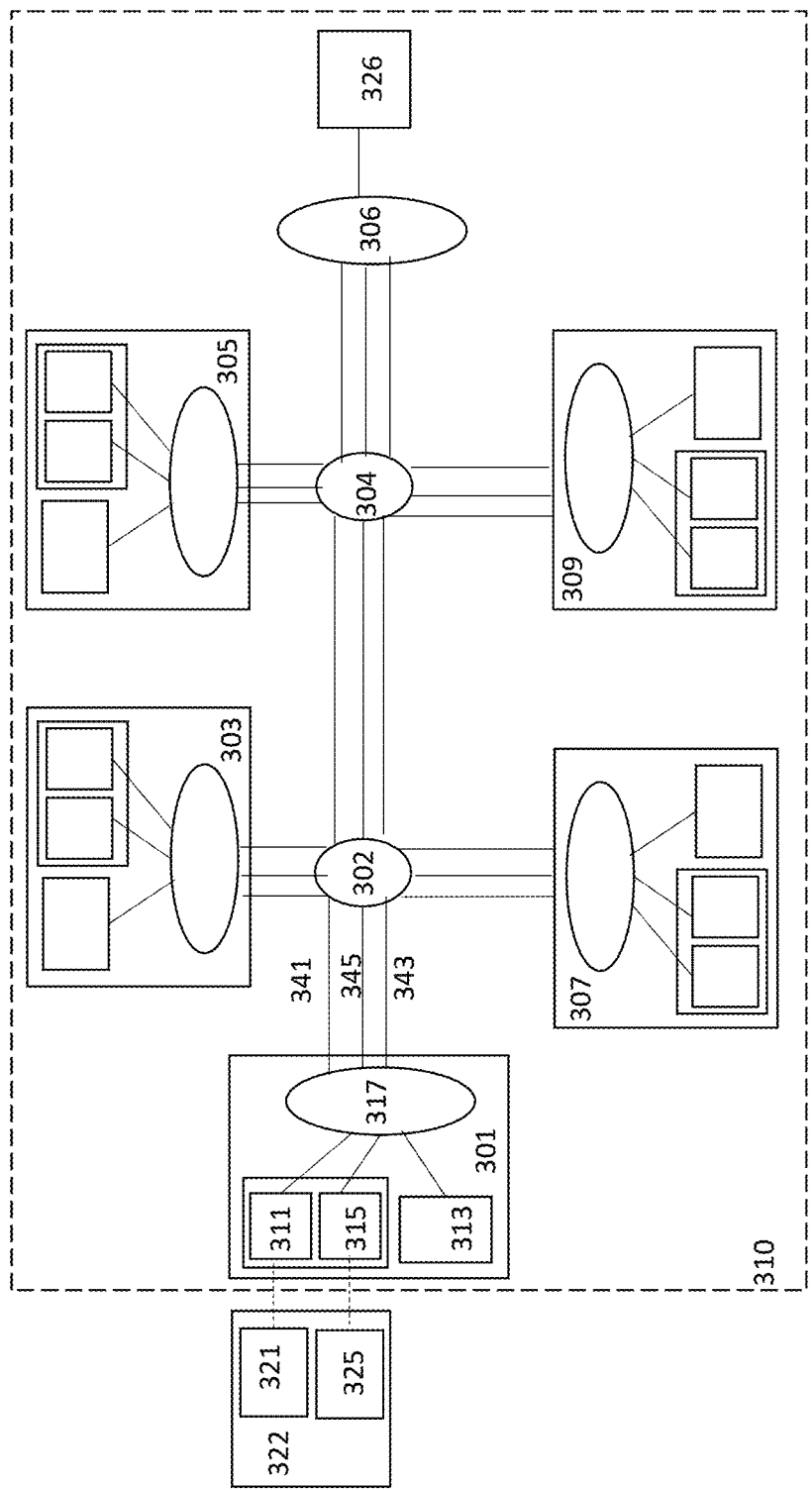
FIG. 3 illustrates example power outlets coupled to direct current power distribution grid within a premise, in accordance with various embodiments.

FIG. 3 illustrates example power outlets, e.g., a power outlet 301, a power outlet 303, a power outlet 305, a power outlet 307, and a power outlet 309, coupled to direct current power distribution grid 310 within a premise, in accordance with various embodiments. In embodiments, the power outlet 301, the power outlet 303, the power outlet 305, the power outlet 307, and the power outlet 309 may be an example of the power distribution apparatus 110 shown in FIG. 1, or the power distribution apparatus 210 shown in FIG. 2.

In embodiments, the power distribution grid 310 includes the power outlet 301, the power outlet 303, the power outlet 305, the power outlet 307, the power outlet 309, and one or more power sources, e.g., a power source 326. As an example, the power outlet 301 may include a power contact 311, a power contact 313, a data contact 315, and a controller 317. Other power outlet, e.g., the power outlet 303, the power outlet 305, the power outlet 307, the power outlet 309 may include similar components as the power outlet 301. The power outlet 301, the power outlet 303, the power outlet 305, the power outlet 307, the power outlet 309 may be embedded within a premise, e.g., walls within the premise. In addition, the power distribution grid 310 may include various controllers, e.g., a controller 302, a controller 304, or a controller 306, which may be connection points or distribution points. In some embodiments, there may be multiple power sources located in various locations within the power distribution grid 310. Furthermore, there may be a power source coupled to a power outlet, e.g., the power outlet 301, the power outlet 303, the power outlet 305, the power outlet 307, the power outlet 309, to inject power into the power distribution grid 310.

In embodiments, a device 322 may be coupled to the power outlet 301 to receive power through the power outlet 301. The device 322 may include a power contact 321 and a data contact 325. A power connection may be established with the power contact 311 and the power contact 321. A data connection may be established with the data contact 315 and the data contact 325. In some embodiments, the power contact 311 and the data contact 315 may form a communication port, which may be a part of a serial I/O interface that is USB 3.x, USB 2.0, or USB 1.1 compliant.

In embodiments, there may be multiple power distribution lines coupled to the power contacts, e.g., a power distribution line 341 coupled to the power contact 311, a power distribution line 343 coupled to the power contact 313. Similarly, there may be multiple data distribution lines coupled to the data contacts, e.g., a data distribution line 345 coupled to the data contact 315. The power distribution line 341 and the power distribution line 343 may operate at different voltage levels. The power distribution line 341 and the power distribution line 343 may be two independent power paths without any intersection. The controller 317, the controller 302, the controller 304, or the controller 306 may perform various negotiation and/or management functions to establish the power distribution line 341, the power distribution line 343, and the data distribution line 345. For example, the power distribution line 341 may be established with the power contact 311 based on a first power contract, the power distribution line 343 may be established with the power contact 313 based on a second power contract, while the data distribution line 345 may be established based on a communication protocol. The controller 317 and/or the controller 302 may provide an extensible and robust solution for negotiating a power contract between a source and a sink. For example, the controller 317 and/or the controller 302 may negotiate a power contract for the power connection 341 established with the power contact 311, or negotiate a power contract for the power connection 343 established with the power contact 313. In addition, the controller 317 and/or the controller 302 may allow for the power contract for the power connection 341 and the power contract for the power connection 343 to be negotiated at a same time for two independent power paths, e.g., the power connection 341 and the power connection 343. The controller 302 may implement a centralized or a distributed power negotiation and management policy to establish the power contracts for the power connections.

Figure 4:
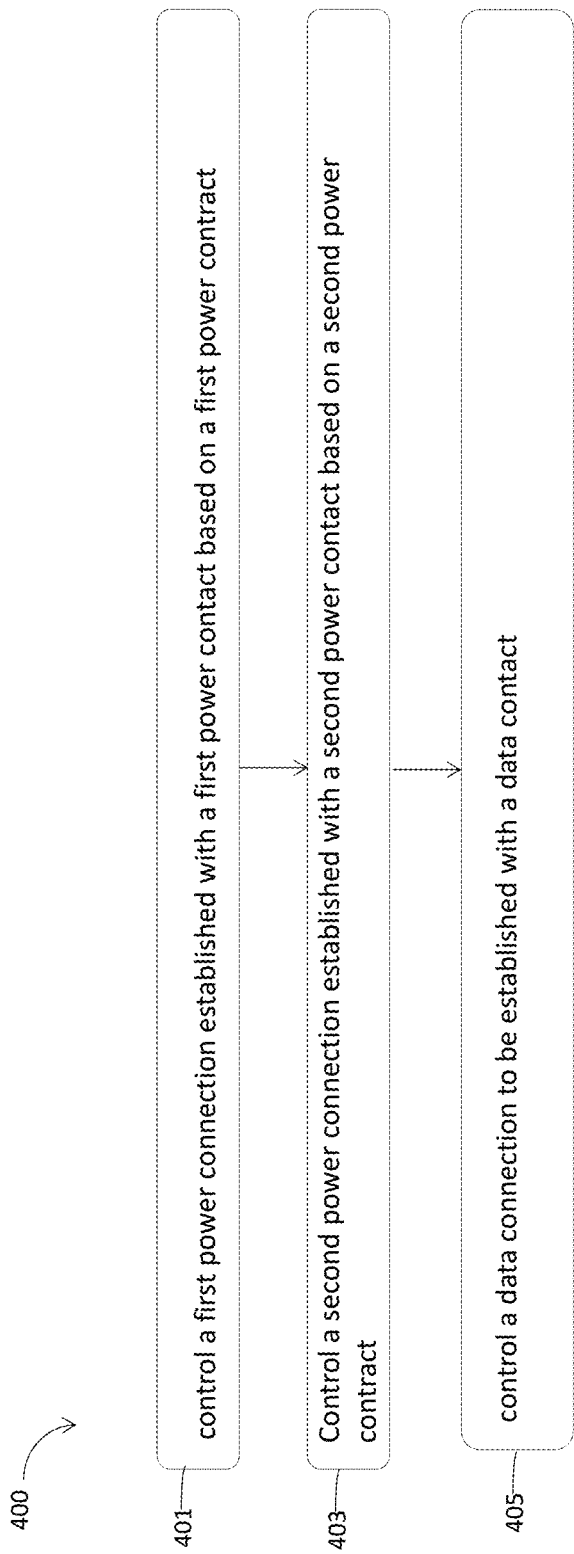
FIG. 4 illustrates an example process to be performed by a controller for direct current power distribution, in accordance with various embodiments.

FIG. 4 illustrates an example process 400 to be performed by a controller for direct current power distribution, in accordance with various embodiments. In embodiments, the process 400 may be a process performed by the controller 117 for direct current power distribution as described in FIG. 1, by the controller 237 for direct current power distribution as described in FIG. 2, or by the controller 317 for direct current power distribution as described in FIG. 3.

The process 400 may start at an interaction 401. During the interaction 401, the controller controls a first power connection established with a first power contact based on a first power contract. For example, at the interaction 401, the controller 117 controls the power connection 141 established with the power contact 111 based on the power contract 142.

During an interaction 403, the controller controls a second power connection established with a second power contact based on a second power contract. For example, at the interaction 403, the controller 117 controls the power connection 143 established with the power contact 113 based on the power contract 144.

During an interaction 405, the controller controls a data connection to be established with a data contact. For example, at the interaction 407, the controller 117 controls the data connection 145 to be established with the data contact 115.

Figure 5:
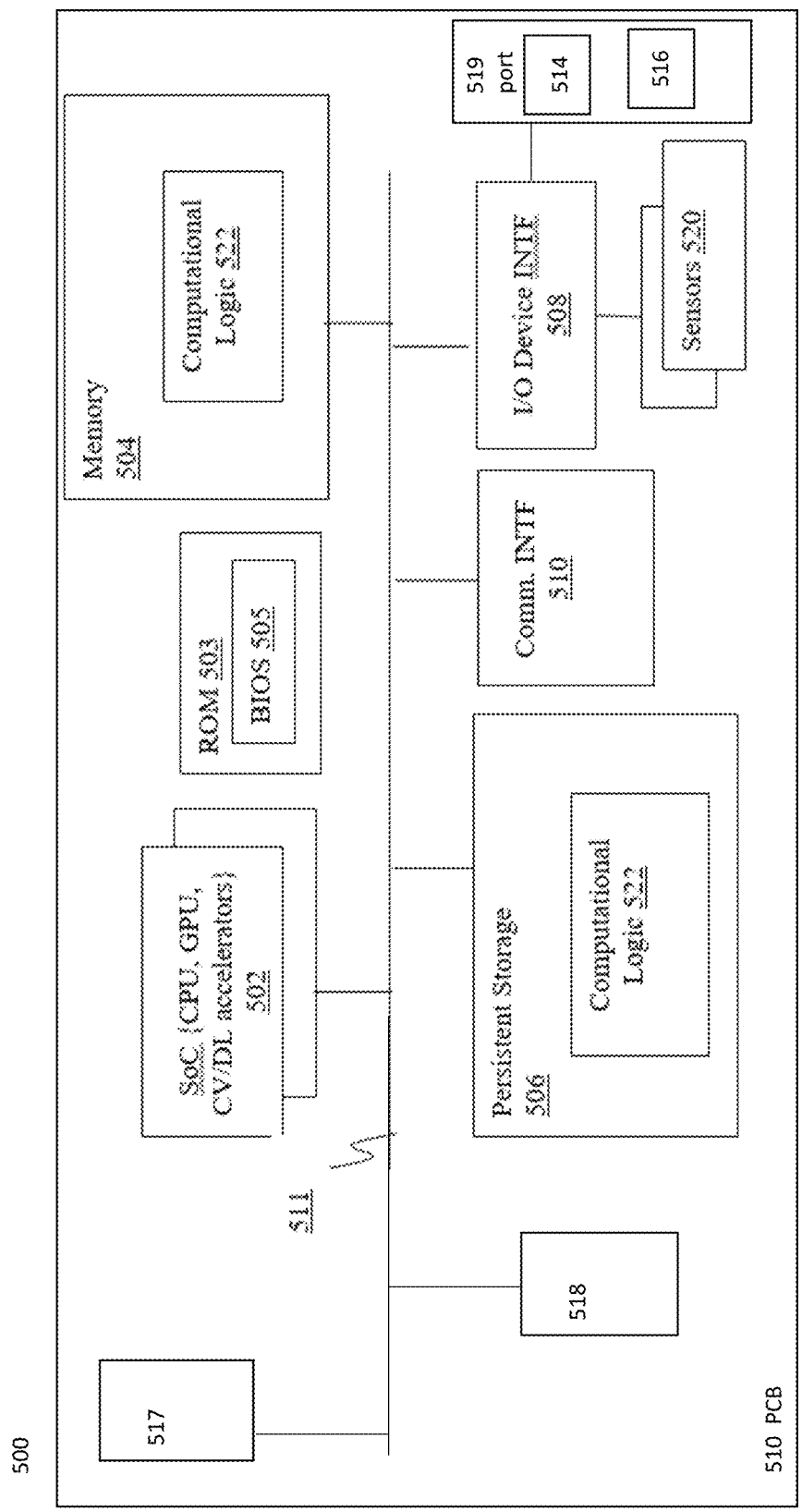
FIG. 5 illustrates a hardware component view of a computing platform suitable to practice the present disclosure, in accordance with various embodiments.
Figure 6:
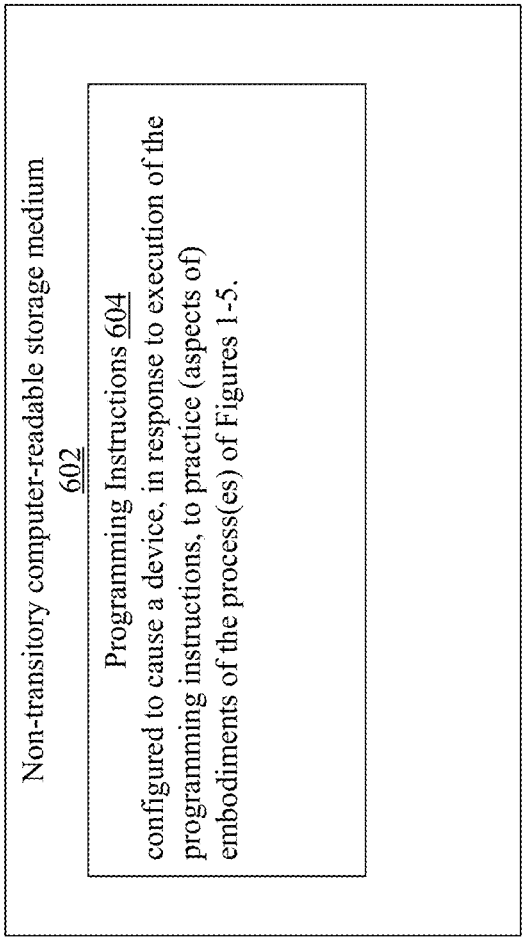
FIG. 6 illustrates a storage medium having instructions for practicing methods described with references to FIGS. 1-4, in accordance with various embodiments.

FIG. 5 illustrates a hardware component view of a computing platform 500 for a controller to control multiple power contacts of a power distribution apparatus for direct current power distribution, in accordance with various embodiments. As shown, the computing platform 500 may include one or more SoCs 502, ROM 503 and system memory 504. Each SoCs 502 may include one or more processor cores (CPUs), one or more graphics processor units (GPU), one or more accelerators, such as computer vision (CV) and/or deep learning (DL) accelerators. ROM 503 may include BIOS 505. CPUs, GPUs, and CV/DL accelerators may be any one of a number of these elements known in the art. Similarly, ROM 503 and basic input/output system services (BIOS) 505 may be any one of a number of ROM and BIOS known in the art, and system memory 504 may be any one of a number of volatile storage known in the art.

Additionally, computing platform 500 may include persistent storage devices 506. Example of persistent storage devices 506 may include, but are not limited to, flash drives, hard drives, compact disc read-only memory (CD-ROM) and so forth. Further, computing platform 500 may include input/output (I/O) device interface(s) 508 to interface with one or more I/O devices (such as display, keyboard, cursor control and so forth) and communication interfaces 510 (such as network interface cards, modems and so forth). In addition, I/O device 508 may include a connector/port 519 including a power contact 514 and a data contact 516, a controller 517, and a power contact 518. The connector/port 519, the controller 517, and the power contact 518 may be included in a power distribution apparatus, e.g., a power outlet, similar to the power distribution apparatus 110 of FIG. 1 or the power distribution apparatus 210 of FIG. 2. In some embodiments, the computing platform 500 may further include a number of sensors 520. Communication and I/O devices 508 may include any number of communication and I/O devices known in the art. Examples of communication devices may include, but are not limited to, networking interfaces for Bluetooth®, Near Field Communication (NFC), WiFi, Cellular communication (such as LTE, 4G, or 5G) and so forth. The elements may be coupled to each other via system bus 511, which may represent one or more buses. In the case of multiple buses, they may be bridged by one or more bus bridges (not shown). Sensors 520 may include light detection and ranging (LiDAR) sensors, geo-positioning sensors, gyroscopes, accelerometers, temperature sensors, humidity sensors, and so forth.

Except of connector/port 519, the controller 517, and the power contact 518, each of the other elements may perform its conventional functions known in the art. In particular, ROM 503 may include BIOS 505 having a boot loader. In embodiments, system memory 504 and mass storage devices 506 may be employed to store a working copy and a permanent copy of the programming instructions implementing the operations associated with an operating system, one or more applications, collectively referred to as computational logic 522. The computational logic 522 may be implemented by assembler instructions supported by processor core(s) of SoCs 502 or high-level languages, such as, for example, C, that can be compiled into such instructions.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium.

FIG. 6 illustrates a storage medium having instructions for practicing methods described with references to FIGS. 1-4, in accordance with various embodiments. As shown, non-transitory computer-readable storage medium 602 may include a number of programming instructions 604. Programming instructions 604 may be configured to enable a device, e.g., a microcontroller or programmable circuit within I/O device interface 508 of computing platform 500, in response to execution of the programming instructions, to implement (aspects of) operations associated with controlling a power distribution apparatus including multiple power contacts for direct current power distribution, as earlier described. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present disclosure has been presented for purposes of illustration and description, but is not intended to be exhaustive or limited to the disclosure in the form disclosed. Many modifications and variations will be apparent to those of ordinary skill without departing from the scope and spirit of the disclosure. The embodiment was chosen and described in order to best explain the principles of the disclosure and the practical application, and to enable others of ordinary skill in the art to understand the disclosure for embodiments with various modifications as are suited to the particular use contemplated.

Thus various example embodiments of the present disclosure have been described including, but are not limited to:

Example 1 may include an apparatus for power distribution, comprising: a first power contact coupled to a first power distribution line supplying direct current (DC) power to the first power contact at a first voltage level; a second power contact coupled to a second power distribution line supplying DC power to the second power contact at a second voltage level; and a controller coupled to the first power contact and the second power contact to control a first power connection established with the first power contact based on a first power contract; or a second power connection established with the second power contact based on a second power contract; wherein the first voltage level is different from the second voltage level.

Example 2 may include the apparatus of example 1 and/or some other examples herein, wherein the first power contract for the first power connection with the first power contact is a part of a first communication protocol, the second power contract for the second power connection with the second power contact is a part of a second communication protocol, and the first and second communication protocols are different communication protocols at least in part.

Example 3 may include the apparatus of example 1 and/or some other examples herein, wherein the first power contract includes parameters for the first power connection about a voltage level of the first power connection, a current level of the first power connection, a power output of the first power connection, a profile of the voltage level of the first power connection, a profile of the current level of the first power connection, or a profile of the power output of the first power connection.

Example 4 may include the apparatus of example 1 and/or some other examples herein, wherein the first voltage level is less than 21 volt, and the second voltage level is higher than 21 volt.

Example 5 may include the apparatus of example 1 and/or some other examples herein, wherein the second power contact is controlled by the controller to supply DC power from the second power distribution line to the second power connection at a third voltage level, that is different from the second voltage level.

Example 6 may include the apparatus of example 1 and/or some other examples herein, wherein the first power distribution line is a part of a communication bus, and the second power distribution line is a part of a power grid of a premise.

Example 7 may include the apparatus of example 1 and/or some other examples herein, wherein the apparatus is a socket, a receptacle, a power outlet, a plug, or a jack.

Example 8 may include the apparatus of example 1 and/or some other examples herein, wherein the first power contact or the second power contacts is coupled to a power source or a power sink.

Example 9 may include the apparatus of example 1 and/or some other examples herein, wherein the apparatus comprises a universal serial bus (USB) type connector having the first power contact, and the second power contact is a standard DC power contact.

Example 10 may include the apparatus of example 1 and/or some other examples herein, further comprising: a power source coupled to the first power contact by the first power distribution line, or coupled to the second power contact by the second power distribution line, wherein the controller is arranged to control operations of the power source based on a third power contract.

Example 11 may include the apparatus of example 1 and/or some other examples herein, wherein the apparatus further includes: a data contact coupled to the controller, wherein the controller is to control a data connection to be established with the data contact.

Example 12 may include the apparatus of example 11 and/or some other examples herein, wherein the first power contact and the first data contact are a part of a downstream facing port (DFP), a upstream facing port (UFP), or a dual-role-data (DRD) port.

Example 13 may include the apparatus of example 11 and/or some other examples herein, wherein the first power contact and the data contact are a part of a serial input/output (I/O) interface that is universal serial bus (USB) 3.x, USB 2.0, or USB 1.1 compliant.

Example 14 may include the apparatus of example 11 and/or some other examples herein, wherein the data contact is a part of an interface for a bi-directional communication protocol, or a half-duplex communication protocol.

Example 15 may include the apparatus of example 11 and/or some other examples herein, wherein the data contact is a part of an interface to facilitate communication according to a communication protocol, selected from either a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit (I$^2$C) protocol.

Example 16 may include an apparatus for communication, comprising: a first power contact coupled to a first power distribution line supplying direct current (DC) power to the first power contact at a first voltage level; a second power contact coupled to a second power distribution line supplying DC power to the second power contact at a second voltage level; and a data contact for a data connection; wherein the first voltage level is different from the second voltage level; and wherein the first power contact and the data contact are a part of a serial input/output (I/O) interface that is universal serial bus (USB) 3.x, USB 2.0, or USB 1.1 compliant.

Example 17 may include the apparatus of example 16 and/or some other examples herein, further comprising a controller coupled to the USB port and the second power contact to control a first power connection established with the first power contact of the USB port based on a power contract of the USB port, and a second power connection established with the second power contact based on a second power contract.

Example 18 may include the apparatus of example 16 and/or some other examples herein, wherein the first voltage level is less than 21 voltage, and the second voltage level is higher than 21 voltage.

Example 19 may include the apparatus of example 16 and/or some other examples herein, wherein the apparatus is a socket, a receptacle, a power outlet, a plug, or a jack.

Example 20 may include the apparatus of example 16 and/or some other examples herein, wherein the USB port is a downstream facing port (DFP), an upstream facing port (UFP), or a dual-role-data (DRD) port.

Example 21 may include an apparatus for computing, comprising: a printed circuit board (PCB); a communication port disposed on the PCB, wherein the communication port includes: a first power contact coupled to a first power distribution line supplying direct current (DC) power to the first power contact at a first voltage level; and a data contact for establishment of a data line to communicate according to a communication protocol; a second power contact disposed on the PCB and coupled to a second power distribution line supplying DC power to the second power contact at a second voltage level; and a controller disposed on the PCB and communicatively coupled to the data contact, the first power contact, and the second power contact to control the communication protocol for the data line; a first power connection established with the first power contact based on a first power contract; and a second power connection established with the second power contact based on a second power contract; wherein the first voltage level is different from the second voltage level.

Example 22 may include the apparatus of example 21 and/or some other examples herein, wherein the first power contract includes parameters for the first power connection about a voltage level of the first power connection, a current level of the first power connection, a power output of the first power connection, a profile of the voltage level of the first power connection, a profile of the current level of the first power connection, or a profile of the power output of the first power connection.

Example 23 may include the apparatus of example 21 and/or some other examples herein, wherein the first voltage level is less than 21 volt, and the second voltage level is higher than 21 volt.

Example 24 may include the apparatus of example 21 and/or some other examples herein, wherein the second power contact is controlled by the controller to supply DC power from the second power distribution line to the second power connection at a third voltage level, that is different from the second voltage level.

Example 25 may include the apparatus of example 21 and/or some other examples herein, wherein the first power distribution line is a part of a communication bus, and the second power distribution line is a part of a power grid of a premise.

It will be apparent to those skilled in the art that various modifications and variations can be made in the disclosed embodiments of the disclosed device and associated methods without departing from the spirit or scope of the disclosure. Thus, it is intended that the present disclosure covers the modifications and variations of the embodiments disclosed above provided that the modifications and variations come within the scope of any claims and their equivalents.

What is claimed is:

1. An apparatus for communication and power distribution, comprising:
   a Universal Serial Bus (USB) Type-C receptacle having a data contact and a plurality of USB power contacts coupled to a first power distribution line supplying direct current (DC) power to the plurality of USB power contacts at a first voltage level;
   a plurality of standard DC power contacts proximally disposed with the USB Type-C receptacle and coupled to a second power distribution line supplying DC power to the plurality of standard DC power contacts at a second voltage level; and
   a controller coupled to the plurality of USB power contacts and the plurality of standard DC power contacts to control a first power connection established by an USB Type-C plug with the plurality of USB power contacts based on a first power contract; or to control a second power connection and a third power connection established by a combination plug simultaneously with the plurality of USB contacts and the plurality of standard DC power contacts based respectively on a second power contract and a third power contract, the combination plug having an USB Type-C plug and at least one other DC plug;
   wherein the first voltage level is different from the second voltage level.

2. The apparatus of claim 1, wherein the first power contract for the first power connection with the plurality of USB power contacts and the second power contract for the second power connection with the plurality of USB power contacts are part of USB's communication protocol.

3. The apparatus of claim 1, wherein the first power contract includes parameters for the first power connection about a voltage level of the first power connection, a current level of the first power connection, a power output of the first power connection, a profile of the voltage level of the first power connection, a profile of the current level of the first power connection, or a profile of the power output of the first power connection.

4. The apparatus of claim 1, wherein the first voltage level is less than 21 volts, and the second voltage level is higher than 21 volts.

5. The apparatus of claim 1, wherein the first power distribution line is a part of a USB bus, and the second power distribution line is a part of a power grid of a premise.

6. The apparatus of claim 1, wherein the apparatus is a socket, a receptacle, or a power outlet.

7. The apparatus of claim 1, further comprising:
   a power source coupled to the plurality of USB power contacts by the first power distribution line, or coupled to the plurality of standard DC power contacts by the second power distribution line, wherein the controller is arranged to control operations of the power source.

8. The apparatus of claim 1,
   wherein the controller is to further control a data connection to be established with the data contact.

9. The apparatus of claim 8, wherein the plurality of USB power contacts and the data contact are a part of a downstream facing port (DFP), a upstream facing port (UFP), or a dual-role-data (DRD) port.

10. The apparatus of claim 8, wherein the data contact is a part of an interface for a bi-directional communication protocol, or a half-duplex communication protocol.

11. The apparatus of claim 8, wherein the data contact is a part of an interface to facilitate communication according to a communication protocol, selected from either a mobile industry processor interface display serial interface (MIPI-DSI) protocol, a high-definition multimedia interface (HDMI) protocol, a display port (DP) protocol, a Miracast protocol, a wireless display (WiDi) protocol, a serial peripheral interface (SPI) protocol, a scalable coherent interface (SCI) protocol, a small computer system interface (SCSI) protocol, a peripheral component interconnect (PCI) protocol, or an inter-integrated circuit ($I^2C$) protocol.

12. The apparatus of claim 1, wherein the plurality of standard DC power contacts are symmetrically disposed around the USB Type-C receptacle.

13. The apparatus of claim 1, wherein the plurality of standard DC power contacts are asymmetrically disposed relative to the USB Type-C receptacle.

14. An apparatus for communication and power distribution, comprising:
   a Universal Serial Bus (USB) Type-C plug having a data contact and a plurality of USB power contacts to mate with a USB Type-C receptacle of a socket to receive direct current (DC) power via the USB power contacts at a first voltage level; and
   a standard DC power plug to simultaneously mate with a DC power contact of the same socket to receive DC power via the standard DC power contact at a second voltage level;
   wherein the data contact is for a data connection in accordance with USB's data communication protocol; and
   wherein the first voltage level is different from the second voltage level.

15. The apparatus of claim 14, wherein the first voltage level is less than 21 volts, and the second voltage level is higher than 21 volts.

16. The apparatus of claim 14, wherein the data connection is part of a downstream facing port (DFP), an upstream facing port (UFP), or a dual-role-data (DRD) port.

17. The apparatus of claim 14, wherein the standard DC power plug is a first standard DC power plug, and the apparatus further comprises a second standard DC power plug to mate with another DC power contact of the same socket to receive DC power via the second standard DC power contact at the second voltage level; and
   wherein a plurality of standard DC power plugs are symmetrically disposed around the USB Type-C plug.

18. The apparatus of claim 14, wherein the standard DC power plug is a first standard DC power plug, and the apparatus further comprises a second standard DC power plug to mate with another DC power contact of the same socket to receive DC power via the second standard DC power contact at the second voltage level;
   wherein a plurality of standard DC power plugs are asymmetrically disposed relative to the USB Type-C plug.

19. An apparatus for computing, comprising:
   a printed circuit board (PCB); and
   a Universal Serial Bus (USB) communication port disposed on the PCB, wherein the communication port includes:
      a USB Type-C receptacle having a data contact and a plurality of USB power contacts coupled to a first power distribution line supplying direct current (DC) power to the USB power contacts at a first voltage level; wherein the data contact is for establishment of a data line to communicate according to USB's communication protocol;
      a plurality of standard DC power contacts proximally disposed with the USB Type-C receptacle and coupled to a second power distribution line supplying DC power to the standard DC power contacts at a second voltage level; and
      a controller coupled to the data contact, the USB power contacts, and the standard DC power contacts to control a communication connection established by a USB Type-C plug with the data line; and a first power connection established by the same USB Type-C plug with the USB power contacts based on a first power contract; or to control a second power connection and a third power connection a combination plug simultaneously established with the plurality of USB power contacts and the standard DC power contacts based respectively on a second power contract and a third power contract, the combination plug having an USB Type-C plug and at least one other DC plug;
   wherein the first voltage level is different from the second voltage level.

20. The apparatus of claim 19, wherein the first power contract includes parameters for the first power connection about a voltage level of the first power connection, a current level of the first power connection, a power output of the first power connection, a profile of the voltage level of the first power connection, a profile of the current level of the first power connection, or a profile of the power output of the first power connection.

21. The apparatus of claim 19, wherein the first voltage level is less than 21 volts, and the second voltage level is higher than 21 volts.

22. The apparatus of claim 19, further comprising a USB controller and a USB bus coupled with the USB controller and the USB communication port.

* * * * *